United States Patent
Schillaci

(10) Patent No.: US 8,366,941 B2
(45) Date of Patent: Feb. 5, 2013

(54) PROCESS FOR EXOTHERMAL TREATMENT AND RECOVERY OF SOLID, SEMI-SOLID, PASTY AND/OR DAMP WASTE

(75) Inventor: Antonino Schillaci, Rome (IT)

(73) Assignee: Antonino Schillaci, Rome (IT)

( * ) Notice: Subject to any disclaimer, the term of this patent is extended or adjusted under 35 U.S.C. 154(b) by 545 days.

(21) Appl. No.: 12/438,398

(22) PCT Filed: Mar. 12, 2008

(86) PCT No.: PCT/SM2008/000006
§ 371 (c)(1),
(2), (4) Date: Apr. 20, 2009

(87) PCT Pub. No.: WO2009/091343
PCT Pub. Date: Jul. 23, 2009

(65) Prior Publication Data
US 2010/0282672 A1    Nov. 11, 2010

(30) Foreign Application Priority Data

Jan. 14, 2008  (SM) .................. SM-A-200800002

(51) Int. Cl.
C02F 1/72 (2006.01)
(52) U.S. Cl. ......... 210/758; 210/764; 210/766; 588/321
(58) Field of Classification Search .................. 210/764, 210/766, 774, 758; 423/445 R, 449.1, 449.8, 423/461; 201/21, 25, 41; 71/11–26; 588/321
See application file for complete search history.

(56) References Cited

U.S. PATENT DOCUMENTS

| | | | |
|---|---|---|---|
| 4,384,923 A * | 5/1983 | Hillekamp | 588/321 |
| 5,238,583 A * | 8/1993 | Fortson | 210/766 |
| 5,788,623 A | 8/1998 | Studer et al. | |
| 5,866,754 A | 2/1999 | De Blangy et al. | |
| 5,931,773 A | 8/1999 | Pisani | |
| 6,857,998 B1 | 2/2005 | Slattery et al. | |
| 2004/0124014 A1 | 7/2004 | Cordova | |

FOREIGN PATENT DOCUMENTS

| | | |
|---|---|---|
| DE | 3826520 A1 | 2/1990 |
| DE | 102007006137 A1 | 8/2008 |
| EP | 0535757 A1 | 4/1993 |
| EP | 0678348 A | 10/1995 |
| WO | 97/27903 A | 8/1997 |

OTHER PUBLICATIONS

International Search Report in Corresponding Application No. PCT/SM2008/000006 Dated May 21, 2010.

* cited by examiner

Primary Examiner — Lucas Stelling
(74) Attorney, Agent, or Firm — Young & Thompson

(57) ABSTRACT

A process for exothermic treatment and recovery of masses including: urban solid waste (USW), including differentiated and non-differentiated damp waste and non-differentiated waste of vegetable origin; sludge generated by industrial and non-industrial water treatment; solid, semi-solid, pasty residue and/or sludge residue coming from industrial, agricultural and food-processing operations; soils and inert materials contaminated by organic matrices; solid, semi-solid, pasty residue and/or sludge residue of hydrocarbon compounds, including asphalt and organic-chemical compounds; contaminating animal excrements, such as those of poultry and/or swine. In particular, the process envisages the use of an exothermic reaction produced by mixing the mass to be treated with a mixture of calcium oxides (CaO) and/or calcium hydroxides $Ca(OH)_2$, in the presence of an inert catalyst moistened with water, in the absence of oxygen using the charcoal-pile technique.

33 Claims, 6 Drawing Sheets

PROCESS FOR EXOTHERMAL TREATMENT AND RECOVERY OF SOLID, SEMI-SOLID, PASTY AND/OR DAMP WASTE

FIELD OF THE INVENTION

The present invention relates to a process for exothermal treatment and recovery of:
- urban solid waste (USW), including differentiated and non-differentiated damp waste and non-differentiated waste of vegetable origin;
- sludge generated by industrial and non-industrial water treatment;
- solid, semi-solid, pasty residue and/or sludge residue coming from industrial, agricultural and food processing operations;
- soils and inert materials contaminated by organic matrices;
- solid, semi-solid, pasty residue and/or sludge residue of hydrocarbon compounds, including asphalt and organic-chemical compounds;
- contaminating animal excrements, such as those from poultry and/or swine.

In particular, said process uses an exothermal reaction generated by a mixture of calcium oxides (CaO) and/or calcium hydroxides $Ca(OH)_2$ in the presence of an inert catalyst moistened with water, in the absence of oxygen using the charcoal-pile technique. In other words, this process could be said to be a process of "Cold Thermal Oxidation" (CTO) and in what follows will be referred to as CTO.

BACKGROUND OF THE INVENTION

Currently known techniques for the treatment and recovery of the materials referred to above are for the most part aimed at:
- declassing the degree of hazard of the waste by conditioning it prior to its disposal in a landfill in the case where it is not possible to reach an effective abatement of the contaminants;
- rendering sludges inert, dehumidifying/drying or solidifying them.

Listed below are some of the most widespread treatment technologies adopted according to the nature of the materials, the contaminated residue, or the waste, which contemplate in part also the use of quicklime.

A. Urban solid waste (USW)

Urban solid waste (USW), including differentiated and non-differentiated damp waste and non-differentiated waste of vegetable origin and the possible damp fraction of differentiated waste are disposed of as follows:
- disposal in landfills, with or without recovery of materials and/or energy;
- compaction with or without quicklime;
- compaction in waterproof bales;
- incineration with or without recovery of energy;
- composting of the differentiated damp solid waste and waste of vegetable origin.

Once disposed of, however, the management of the USW involves a series of disadvantages, amongst which:
- the difficulty of selection for a possible further differentiated recovery;
- the risk of pollution of groundwater and air;
- a negative social and environmental impact.

B. Sludge

Sludge may be classified into two types: hazardous sludge and non-hazardous sludge.

Non-hazardous sludge, which is generated by urban installations for water treatment, undergoes:
- centrifugal separation and disposal in landfills;
- thermal drying prior to disposal in landfills or composting;
- inertization and dehumidification with quicklime in ground or granulated form;
- incineration.

Hazardous sludge, generated by industrial water-treatment installations, contains metals and non-metabolized compounds, and undergoes:
- centrifugal separation and disposal in landfills;
- thermal drying prior to disposal in landfills;
- inertization and dehumidification with quicklime in ground or granulated form;
- fixation with mixes of cement-bentonite mortars prior to disposal in landfills;
- incineration C. Residue of Industrial Processes Industrial residue may be solid, semi-solid, pasty and/or damp.

Solid industrial residue waste undergoes:
disposal in classified landfills or recycling.

Semi-solid, pasty and liquid industrial residue undergoes:
- centrifugal separation;
- chemical washing and subsequent treatment of the fluid solvent and disposal in landfills or incineration of the resultant solid matter;
- inertization with ground or granular slaked lime, which leaves a pasty residue, or with quicklime, which leaves a dry residue: the two techniques are applied for declassing the waste from hazardous to non-hazardous; the waste is in any case disposed of in landfills;
- thermal and chemical oxidation;
- fixation with mixes of cement-bentonite mortars;
- incineration.

D. Soils

Contaminated soils and inert materials undergo:
- disposal in landfills;
- chemical or microbiological treatment, which may be conclusive;
- inertization with powdered or granular quicklime, which, at the current state of the art, produces only declassing of the waste and not reclamation of the contaminated soil in compliance with regulatory standards;
- chemical washing;
- incineration.

RELATED ART

The existing patent documents regard techniques that may be classified in the sector of inertization and that use the exothermal reaction with calcium oxides CaO and/or calcium hydroxides $Ca(OH)_2$ to declass the hazardous waste into non-hazardous waste.

In any case, the patent protection basically regards the type and grain size of the calcium oxide used as reagent, or else regards the treatment of only the hydrocarbon organic fraction as contaminant or residue that can be subjected to treatment, or else regards the duration of the treatment.

The document No. US-A-4 079 003 describes a technique in which the quicklime is used in the form of particles that have a minimum size similar to a grain of rice (3 mm).

The European Patent No. 0306430 claims use of granulated anhydrous calcium oxide with a grain size of up to 140 mm to produce an exothermal reaction which lasts from fifteen (15) minutes to three (3) hours in order to declass the hydrocarbon residue to non-hazardous waste prior to disposal in landfills by converting said waste into a non-hazardous water-repellent product with low organic content, in accordance with the current standards for disposal in landfills.

SUMMARY OF THE INVENTION

Therefore, the main purpose of the present invention is to overcome the aforesaid disadvantages, by providing a CTO process for exothermal treatment of: urban waste, sludges, residues of industrial processes, soil and inert materials contaminated by organic matrices, whether these be solid, semisolid, pasty or damp in order to produce, as residue, a dry mass that can be completely recovered and re-utilized, said process being able to reach the necessary temperature for the type of treatment required, without ignition of the mass and without giving rise to emissions into the atmosphere.

The above is achieved, according to the invention, by means of an exothermal reaction that is produced by mixing the mass to be treated with a mixture of calcium oxides CaO and/or calcium hydroxides $Ca(OH)_2$ in the presence of an inert catalyst moistened with water and in the absence of oxygen, using the charcoal-pile technique with one or more piles or using a purposely designed batch reactor.

For a better understanding of the invention, there follows a description with reference to the attached plates of drawings, which regard a preferred embodiment thereof, provided purely by way of non-limiting example.

DETAILED DESCRIPTION OF THE INVENTION

Figure 1:
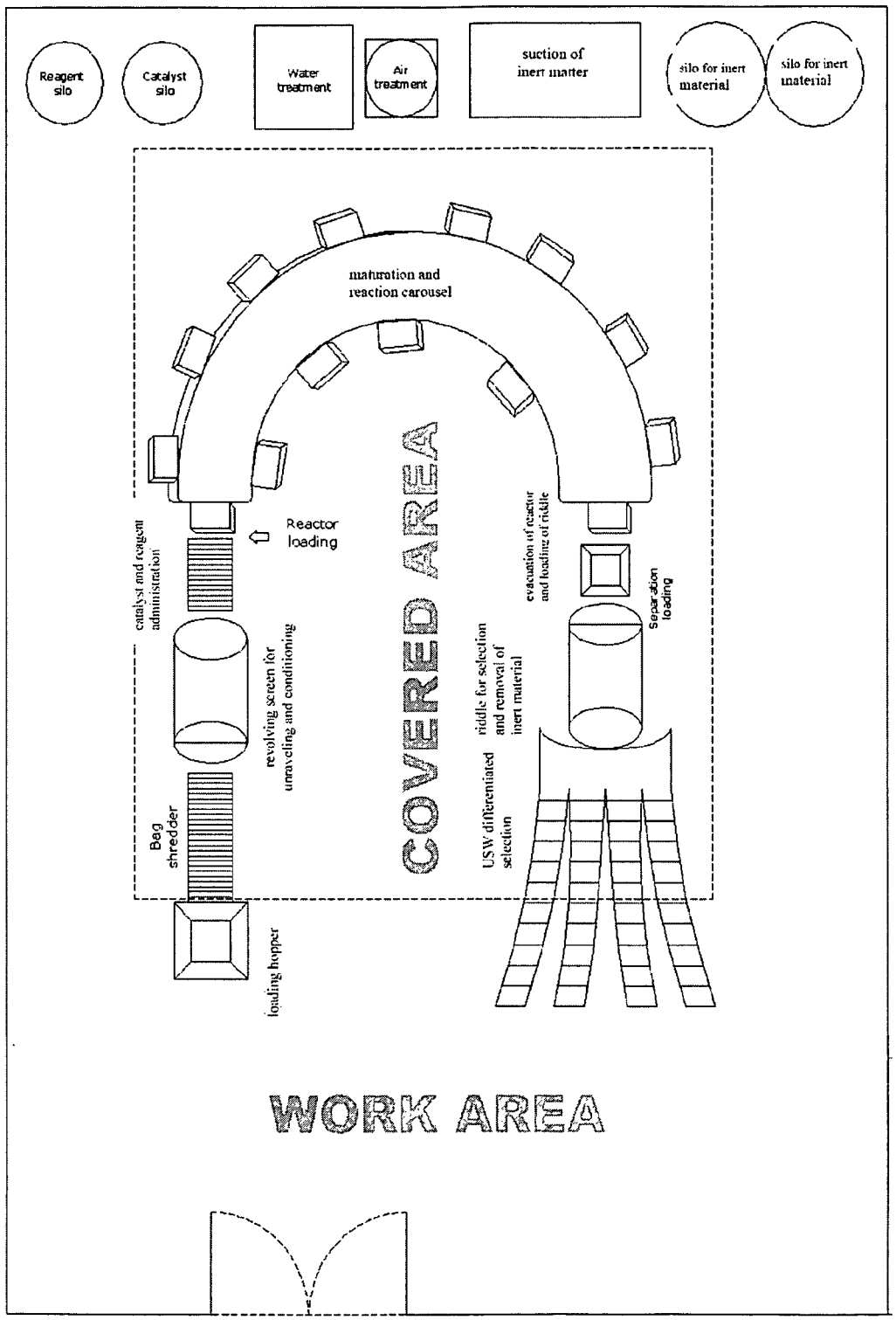
FIG. 1 shows the layout of a typical plant for continuous treatment of urban solid waste (USW)
Figure 2:
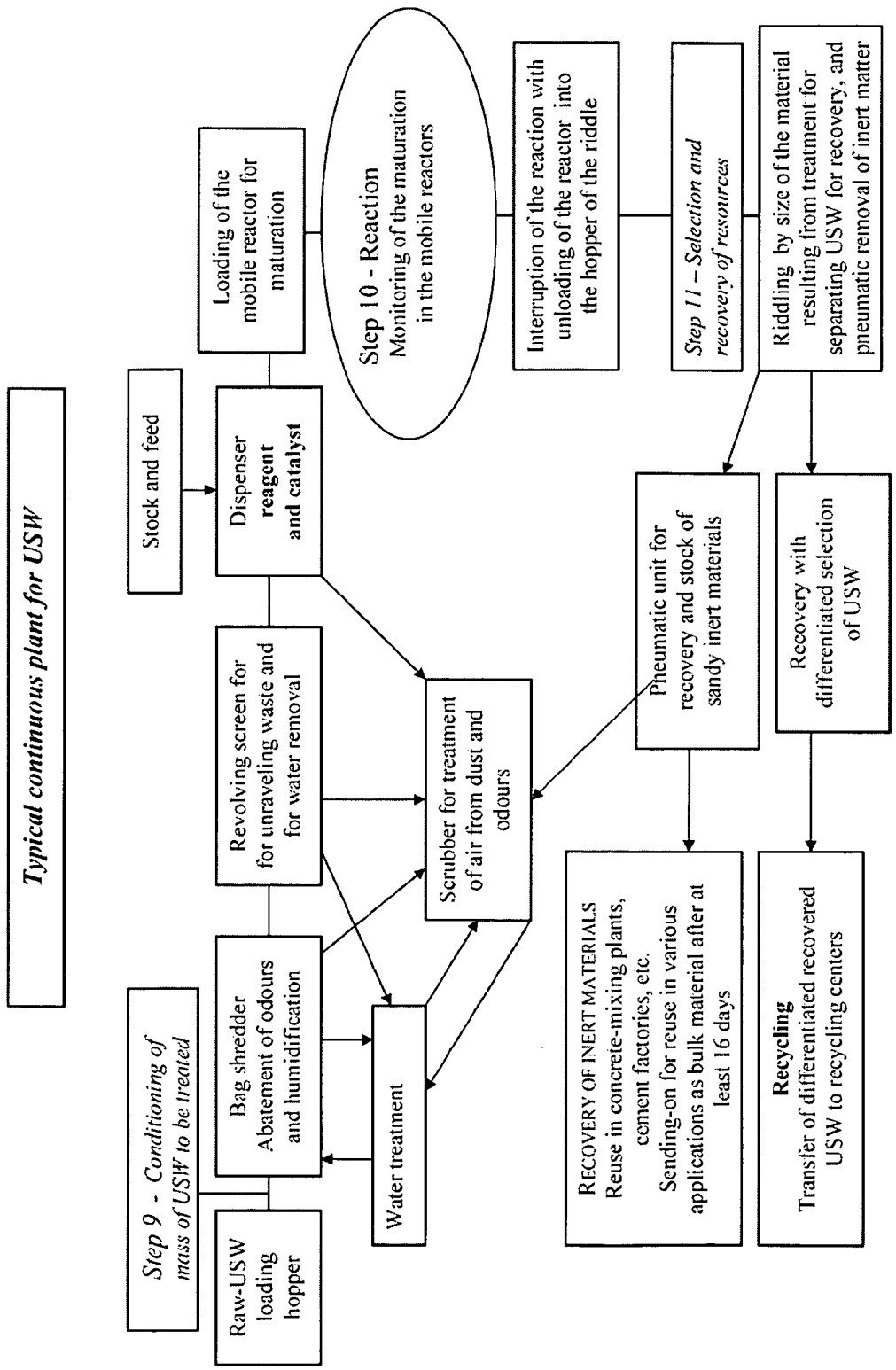
FIG. 2 shows a flowchart for the treatment of urban solid waste (USW)
Figure 3:
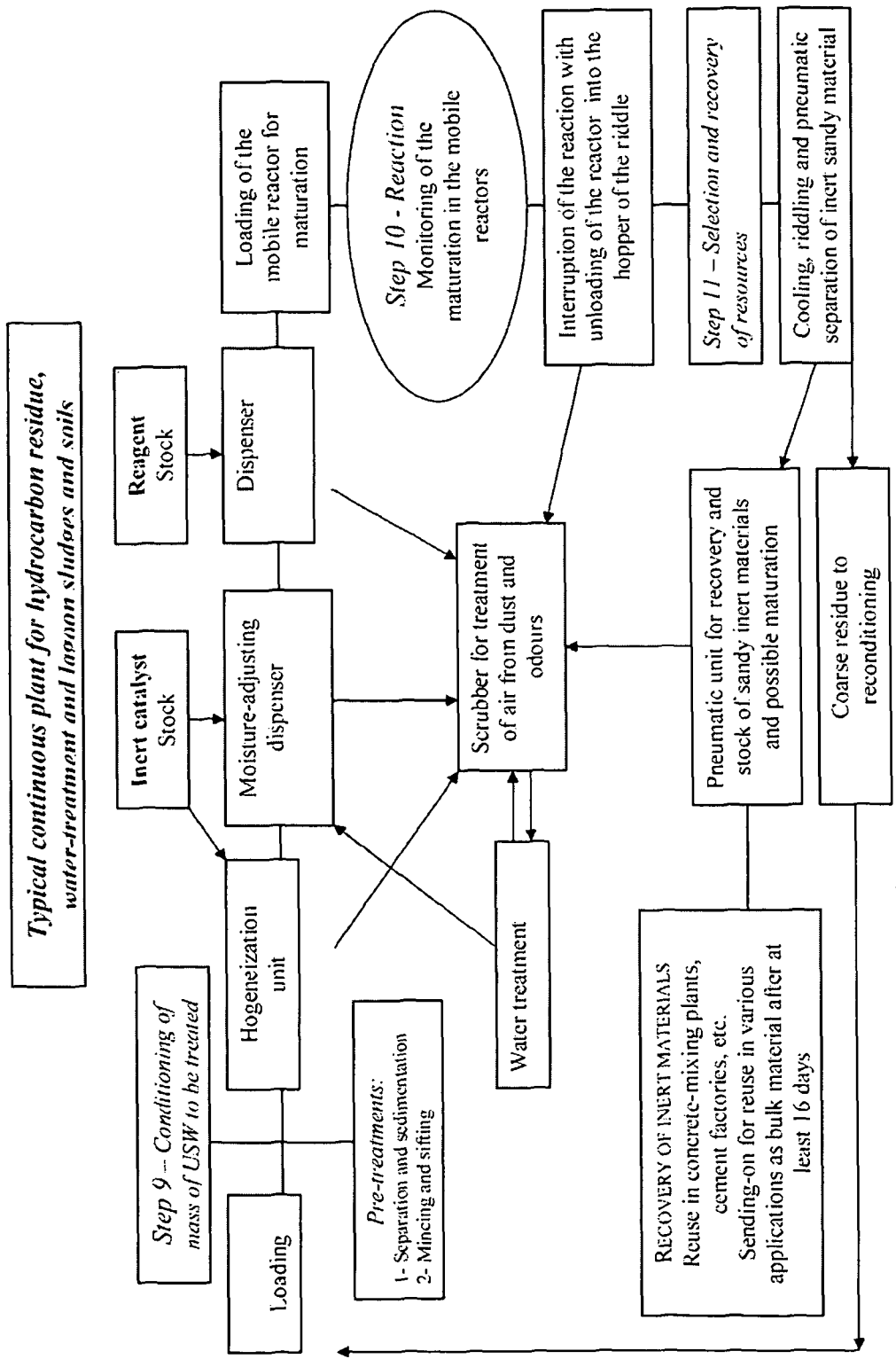
FIG. 3 shows a flowchart for the treatment of hydrocarbon residue.

The process according to the present invention basically envisages control and modulation of the exothermal reaction within given temperature ranges, which are a function of the material to be treated, as appears in Table 1 below, in order to generate the temperature required for the specific type of treatment, without causing ignition of the mass and without giving rise to emissions into the atmosphere.

In addition to the temperature ranges, Table 1 also gives the average duration of the treatment, and the specific type of treatment for the type of waste.

TABLE 1

| Temperature | Reaction time | Type of treatment | Nature of waste |
| --- | --- | --- | --- |
| 60-100° C. | 15-60 min | Sterilization Desiccation | Biological sludge from non-industrial water treatment |
| 80-120° C. | 15-60 min | Sterilization Desiccation Fixation | USW, including damp waste and/or non-differentiated solid waste and non-differentiated vegetable waste |
| 150-250° C. | 1.5-24 h | Oxidation Desiccation Fixation | Biological sludge from industrial water treatment |
| 150-250° C. | 8-48 h | Oxidation Desiccation Fixation | Residue from industrial processes Soils and inert materials contaminated by organic matrices |
| >250° C. | 12-72 h | Oxidation Desiccation Fixation | Residue* from hydrocarbon and organic-chemical compounds |

*In the treatment of hydrocarbon compounds, including asphalt compounds, with the exothermal reaction in the absence of oxygen, temperatures of up to 400-500° C. may be reached given that the reaction is sustained by the organic charge of the compound itself.

Beyond 250-300° C., the material by pyrolysis undergoes breaking of the original molecular bonds, with the formation of simpler molecules.

In the process described, the control and modulation of the temperature occur according to three main factors:

1. a reagent basically constituted by a specific mixture of granular calcium oxide and/or hydroxide of various grain size according to the type of treatment;
2. controlled humidity of the catalyst according to the reactivity of the reagent;
3. absence of oxygen using the charcoal-pile technique.

The process according to the invention is applied with a specific procedure described in a protocol purposely drawn up according to the data acquired in the course of an appropriate preliminary feasibility test which must be carried out on the waste to be treated, a general procedure being illustrated in what follows.

The reagent is a mixture of calcium oxides (CaO) and/or calcium hydroxides Ca(OH)2 in granular form, selected and classified according to their specific reactivity as a function of the grain size or mixtures thereof.

In fact, the temperature required for the type of treatment determines the composition of the mixture of the granulate of the reagent.

Summarized in Table 2 below are the temperatures that can be reached by the type of mixture of granulate. The data appearing in Table 2 are purely indicative and may vary according to the reactivity of the reagent, which is conditioned by the mineral structure of the lime, the method, and the temperature of calcining in the kiln.

The reactivity of the reagent is to be characterized according to grain size and origin of the oxide in order to be able to define the mixtures and the amounts to be administered and in order to fix the protocol of the process to be applied.

TABLE 2

| Temp. ° C. | Granulometric mixture of reagent | | | |
|---|---|---|---|---|
| | 3-5 mm | 5-7 mm | 7-10 mm | 10->15 mm |
| 80-100 | 100% | | | |
| 100-130 | 50% | 50% | | |
| 130-200 | | 50% | 50% | |
| 200-250 | | 30% | 30% | 40% |
| >250 | | 20% | 20% | 60% |

According to the invention, the catalyst is a moistened inert material that enables release of an amount of water sufficient to liberate the entire specific reactivity of the reagent.

The moisture may range from 20% to 50% according to the nature of the catalyst itself, as well as to the reactivity and the grain size of the reagent.

The moisture is defined during the preliminary phase of characterization of the reagent and subsequently verified with the feasibility test referred to previously.

The inert matter of the catalyst moreover has the function of fixing, within its porosity which is dilated by the temperature, the contaminants that are released in the reaction phase.

The catalyst may be basically constituted by an in inert material or a mixture of inert materials such as sand, soil, cement, bentonite, ash, or inert matter resulting from other batches or treatments, the latter being particularly indicated for the insulating action exerted in the charcoal pile.

The charcoal-pile technique is applied to obtain, with the exothermal reaction in the absence of oxygen, the temperature necessary for the type of treatment, without ignition of the mass and without giving rise to any emission into the atmosphere.

For the treatment of hydrocarbon organic compounds, including long-chain ones, the control of the exothermal reaction in the absence of oxygen is such as to bring the mass up to the temperature of self-ignition, i.e., higher than 250° C. Then, given that the action is self-sustaining, according to the organic charge, high temperatures of up to 400-500° C. are developed.

When the temperature exceeds 250-300° C., in conditions of total absence of oxygen, pyrolysis is triggered, whereby the pollutant organic material undergoes breaking of the original chemical bonds with the formation of simpler molecules.

The charcoal-pile technique moreover enables control and containment of emissions into the atmosphere and their possible release.

In addition, according to the purpose of the treatment, the charcoal-pile technique may be used to obtain desiccation and/or oxidation of all the mineral, animal and vegetable organic compounds, as well as to obtain fixation of leachate and of the metals dissolved and/or present in the fine sediments, inside the porosities of the inert material to be treated and/or of the catalyst opened up by the temperature.

The dry residue produced by the treatment is advantageously made up of:

1. solid materials dispersed in the waste, which are rendered recoverable, in a differentiated way, and recyclable;
2. recoverable, valorizable, and reusable inert material, made up of:
  a. dry mass of the material treated
  b. residual calcinates and carbonates of the reaction
  c. inert matter of the catalyst The aforesaid inert material obtained with the process according to the invention presents characteristics of a calcinate which is dry, sandy, thermally insulating and sound-proofing, water-repellent, oil-absorbing with a specific weight lower than unity (see Table 4 and FIG. 1).

At the end of the process, the residue can be riddled and selected in order to separate the inert materials in the sandy fine state from the solid coarse parts, which can be recovered and differentiated for reuse, as in the case of urban solid waste (USW).

The inert fraction can in turn be sent on for recovery, with final fixation in concrete-mixing plants or cement factories, or else reused as bulk inert material after a pre-set period of maturation, which, according to current Italian regulatory standards (Ministerial Decree of Feb. 5, 1998, Legislative Decree 471 and Legislative Decree 152/2006), is at least 16 days, or else again reused in agriculture as fertilizer for soil amendment and/or compost, which is the inert material originating from urban biological sludge and/or materials of animal or vegetable origin.

Before it is possible to classify the residue as inert material for final use, it must undergo the chemical analyses of leaching (as envisaged by current standards).

Tests conducted by the present applicant have proven the effectiveness of the treatment according to the present invention.

Said tests were carried out in particularly critical working conditions also on account of the quality of the treated residue: petroleum tailings from the bottom of tanks of crude oil, in a pasty, shovellable state mixed with detritus of various kinds.

The tests comprise a pilot test, during which approximately 120 m$^3$ of tank bottoms of crude oil in the pasty, pitch-like state mixed with sediments of iron particles, sand, plastics, burlap, bags, paper, and waste of vegetable origin were treated.

The reaction was obtained with natural calcium oxides CaO and calcium hydroxides $Ca(OH)_2$, selected and balanced with the inert catalyst and thoroughly homogenized, following the specific procedure.

A controlled exothermal reaction was produced, which reached a temperature higher than 450° C.

The pilot test was carried out with the aid of a backhoe, the bucket of which had been specifically adapted to facilitate the operation of homogenization, and turning-over in the period of maturation of the residue, followed by riddling in the final riddling step.

The process carried out for the pilot test enabled:
a. oxidation by pyrolysis of the organic compounds;
b. irreversible fixation of the dissolved heavy metals;
c. desiccation or carbonatation of the other materials; and
d. valorization of inert material resulting from the treatment.

The pilot test moreover confirmed that the process is safe. With the simple application in batches using a backhoe of a known type, taking care to apply the operating precautions developed in compliance with the process protocol and the succession of operations of Step 3 described hereinafter, as well as the scrupulous implementation of the charcoal-pile technique, the process does not present any risks or problems of safety for the operators and for the site in which it is carried out:

as regards the operating staff, it is only necessary for them to be equipped with standard individual protection devices;
as regards the safety of persons and things, the process does not give rise to any phenomena of ignition;

as regards the environment, no emission into the atmosphere occurs: the process contains, withholds, does not release, and oxidizes any seepage leachate and vapours.

Even though the process according to the present invention falls within treatments of inertization using calcium oxides (CaO) and hence is already classified amongst treatments allowed by current standards in force in all countries, it should be noted that it is a conclusive process of oxidation and desiccation given that it does not envisage any further treatment or disposal, but enables recovery of the treated materials, so that it differs substantially from traditional methods of inertization.

The process described herein, in fact, is conclusive because it enables recovery of resources, including the materials used for the treatment. From the standpoint of the physico-chemical characteristics, the inert matter resulting from the treatment is, as has been said, a sandy, dry material with low permeability, water-repellent, compressible, oleophilic, basic, and insulating, having a specific weight lower than unity. In addition, the residual contaminant falls within the limit concentrations allowed both for the residue as such and for the leachate.

After the period of maturation, the volume and weight of the material resulting from the treatment are considerably decreased. As appears from Table 3 below, the weight decreased by a factor of just below 50% with respect to the original weight, whilst the volume decreased by more than 16% with respect to the initial volume.

TABLE 3

| MATERIAL | VOLUME | BULK DENSITY | WEIGHT |
|---|---|---|---|
| Residue as such | 128 m$^3$ | 1.70 g/cm$^3$ | 217.6 tonnes |
| Residue after inertization* | ~108 m$^3$ | 0.99 g/cm$^3$ | 106.92 tonnes |
| Reduction | 20 m$^3$ | 0.71 g/cm$^3$ | 110.68 tonnes |
| % reduction at end of reclamation | 16.78% | 58.23% | 49.13% |

*including reagent and catalyst

At the end of the pre-set period of maturation (which, as already mentioned, according to the current regulatory standard is sixteen days), via laboratory chemical analyses of leaching or lixiviation, it has been possible to assess the results obtained, which confirm the experiments and feasibility tests conducted in the laboratory.

A first advantage of the invention lies in the minimization of the waste, which is incentivized by current regulatory standards in force in all countries, with substantial benefits of an environmental, economical, and social nature.

A second advantage is that of favouring production activities induced by recycling the recovered materials.

A third advantage is represented by the possibility of recovering the resources dispersed in the waste and the materials themselves necessary for treatment, namely, the calcined spent reagent and the catalyst as inert residue (Table 3).

A fourth advantage is represented by the possibility of reducing the problems of environmental and social impact deriving from the collection and disposal of urban solid waste.

A fifth advantage is represented by the possibility of applying the invention according to batch or continuous modalities, both for modest amounts and for large amounts using materials and machinery that are widely used in agriculture, quarries, or for civil works.

A sixth advantage is that of avoiding, as for most petrochemical compounds, the need to resort to treatments that may have a negative impact on the soil, subsoil, and air, such as, for example, incineration, physical or chemical oxidation, washing, and physical and chemical desorption, which also entail high costs.

The laboratory chemical analyses conducted on the sample of hydrocarbon residue prior to treatment and on the inert residue after the period of maturation are summed up in Table 4 below, where they are set in comparison with the limit concentration of acceptability in the soil allowed by the Ministerial Decrees DM 471/99 and DM 152/2006.

The laboratory results demonstrate the effectiveness of the treatment and go well beyond the limits imposed by current regulatory standards.

TABLE 4

| | | INERT RESIDUE | | CONCENTRATIONS ALLOWED IN THE SOIL |
|---|---|---|---|---|
| ANALYTICAL DETERMINATIONS | SLUDGE | AS SUCH | LEACHATE TEST | DM 471/99 - 152/2006 |
| Bulk density | 1.7 g/cm$^3$ | 0.99 g/cm$^3$ | | |
| Residue at 105° C. | 96 wt % | | | |
| Residue at 600° C. | 44.5 wt % | | | |
| Total oils (Soxhlet ether extract) | 39.2 wt % | | | |
| pH | 7.2 | 12.4 | | |
| Total hydrocarbons with up to 12 C (mg/kg) | | <2 | 2 | 250 |
| Total hydrocarbons with 12 to 25 C (mg/kg) | | 72.4 | 4.53 | 750 |
| Benzene (mg/l) | <5.0 | <2 | <2 | 2 |
| Toluene (mg/l) | 7.2 | <2 | <2 | 50 |
| Xylene (mg/l) | 10.4 | <2 | <2 | 50 |
| Arsenic (As) (g/l) | 2.6 | | <0.01 | 50 |
| Cadmium (Cd) (g/l) | 1.6 | | 0.0005 | 15 |
| Chromium (Cr) (g/l) | <1.0 | | <0.01 | 15 |
| Mercury (Hg) (g/l) | <1.0 | | 0.0005 | 5 |
| Soluble copper (Cu) (g/l) | >1.0 | | <0.01 | 6 |
| Selenium (Se) (g/l) | <1.0 | | 0.0005 | 15 |

The CTO (cold thermal oxidation) process according to the invention is implemented with a specific in-batch or in-line treatment, the protocol of which, as already mentioned, varies according to the type of contaminant and type of waste, industrial residue, soil or sludge that is to undergo treatment.

The process basically comprises three phases:
Phase I—Preliminary Activities
Phase II—Pre-operative Activities
Phase III—Implementation of process
Each of the aforesaid phases in turn comprises a plurality of substeps or operations.

| PHASES AND CORRESPONDING STEPS | | |
|---|---|---|
| Phase I Preliminary activities | Step 1 | Selection and characterization of available reagents |
| | Step 2 | Characterization of the mass to be treated and of the contaminant |
| | Step 3 | Feasibility test |
| | Step 4 | Process protocols and preliminary project |
| Phase II Pre-operative activities | Step 5 | Verification of compliance to regulatory standards |
| | | Request for authorizations |
| | | Organization of intervention |
| | Step 6 | Executive project |
| | | Planning of intervention |
| | Step 7 | Structural and operative arrangements |
| | Step 8 | Pre-commissioning and commissioning |
| Phase III Implementation of process | Step 9 | Conditioning of the mass to be treated |
| | Step 10 | Reaction |
| | Step 11 | Recovery of resources: dry fine treated residue dry coarse treated residue |

Phase 1 Preliminary Activities

Phase 1—Step 1 Selection and Characterization of Available Reagents

The efficiency of the treatment strictly depends upon the chemico-physical characteristics of the reagent (CaO and/or Ca(OH)$_2$). In fact, the reactivity of the oxides and hydroxides may vary according to the chemico-physical structure of the geological formation of the limestone and the type of process in the kiln: type of kiln and calcining temperature.

If the treatment to be performed requires temperatures higher than 150° C., it is preferable for the reagent to be constituted by granulate having a reactivity such as to require an amount of mixture not higher than 25% of the material to be treated.

It is moreover preferable for the oxides and/or hydroxides to be obtained from a limestone source rich in silicates and magnesium, for the stone to be roasted at a temperature higher than 1000° C., and for the granulate selected to be free from lime in powder form.

The use of a reagent with low reactivity is instead indicated in low-temperature treatments usually necessary for non-industrial biological sludge and urban solid waste.

According to the reactivity of the reagent available, the following parameters must be fixed:
a. the diameter of the granules or else the mixture of the granules of different grain size in order to modulate and release the maximum reactivity to give rise to a progressive increase of the temperature in time;
b. the humidity sufficient for releasing the entire specific reactivity of the reagent; in effect, if the moisture is insufficient, it does not enable exploitation of the entire reactivity of the reagent, whereas an excessively high moisture cools down and accelerates the reaction without enabling completion of the process required by the treatment.

Phase 1—Step 2 Characterization of the Mass to be Treated and of the Contaminant; Definition of the Purpose of the Treatment With the exception of urban solid waste (USW), the materials to be treated, even though they are of the same nature, do not necessarily always have the same charge of contaminants. Consequently, in order to define the process protocol, it is necessary to determine:

A.) the nature and chemico-physical characteristics of the waste and/or of the industrial residues, soils, sludges, or mixtures thereof;

B.) the concentration and nature of the contaminants, with particular attention paid to the organic charge and to the nature and concentration of the metals;

C.) the purpose of the treatment at which the process is aimed, namely:
oxidation of organic compounds;
fixation in an irreversible way of the dissolved heavy metals;
desiccation, sterilization, and fixation of the eluates of the damp solid waste;
desiccation and sterilization of sludge from treatment plants.

Phase 1—Step 3 Preliminary Feasibility Test

According to the present invention, once the reagents have been selected on the basis of the characteristics of the reagents available, once the mass to be treated has been characterized, and once the consequent purpose of the treatment has been defined, a preliminary feasibility test is conducted.

The above test, according to the purpose that it is intended to achieve with the treatment (oxidation, fixation, desiccation, sterilization) has the function of determining: the temperature and duration of the reaction required by the type of treatment; the most appropriate catalyst and its relative humidity; and the grain size and mixture of the granulate of the reagent to be applied.

Phase 1—Step 4 Process Protocols and Preliminary Project

On the basis of the data gathered in the first three steps, the following documents are drawn up:
the process protocol with the technical specifications for the treatment and the corresponding sequence of operations;
the preliminary project of the treatment plant, with the definition of the machinery and materials required, and the preventive measures for the protection of health and safety.

Phase 2 Pre-Operative Activities

Phase 2—Step 5 Verification of Compliance to Regulatory Standards, Request for Authorizations, and Organization of Intervention Given that the issue of waste is subject to stringent regulatory standards, in the pre-operative phase a verification must be made, together with the customer, on the compliance with the regulatory standards regarding the nature of the treatment that is to be performed, and hence, the entire procedure must be followed in order to request from the local authorities the authorizations that are specific for the type of treatment and facility.

Likewise to be defined with the customer is the adequate structure and the technical and financial plan necessary for implementing the process that has been defined.

Phase 2—Step 6 Executive Project and Planning of Intervention

According to the nature and purpose of the treatment, the executive project of the intervention is drawn up. In this step, all the design and planning activities are developed, which include: selection of the machinery, detailed projects, type of arrangements, selection of the materials, plan for valorization of recoverable resources, and stipulation of orders with suppliers.

Phase 2—Step 7 Structural and Operative Arrangements

In this step, the structural and operative activities for arrangement and installation of the machinery and of the plant are carried out.

The operations of indicative arrangement may comprise, among other things: preparation of a manoeuvring yard and provisional-storage area, fixed or mobile roofings of a greenhouse type, control and treatment of atmospheric air for the dust, vapours, odours, and water treatment, where necessary.

Phase 2—Step 8 Pre-Commissioning and Commissioning

All the activities are carried out for training of the staff involved, verification, testing, and necessary adjustments for start-up, with commissioning and calibration of the plants and systems up to the production cycle of the process.

Phase 3 Implementation of Process

The process will be implemented on the basis of the activities performed in the preliminary phase and set down in the process protocol.

Phase 3—Step 9 Conditioning of the Mass to be Treated

According to the invention, the conditioning of the mass to be treated envisages a series of operations to be performed in sequence.

Figure 5:
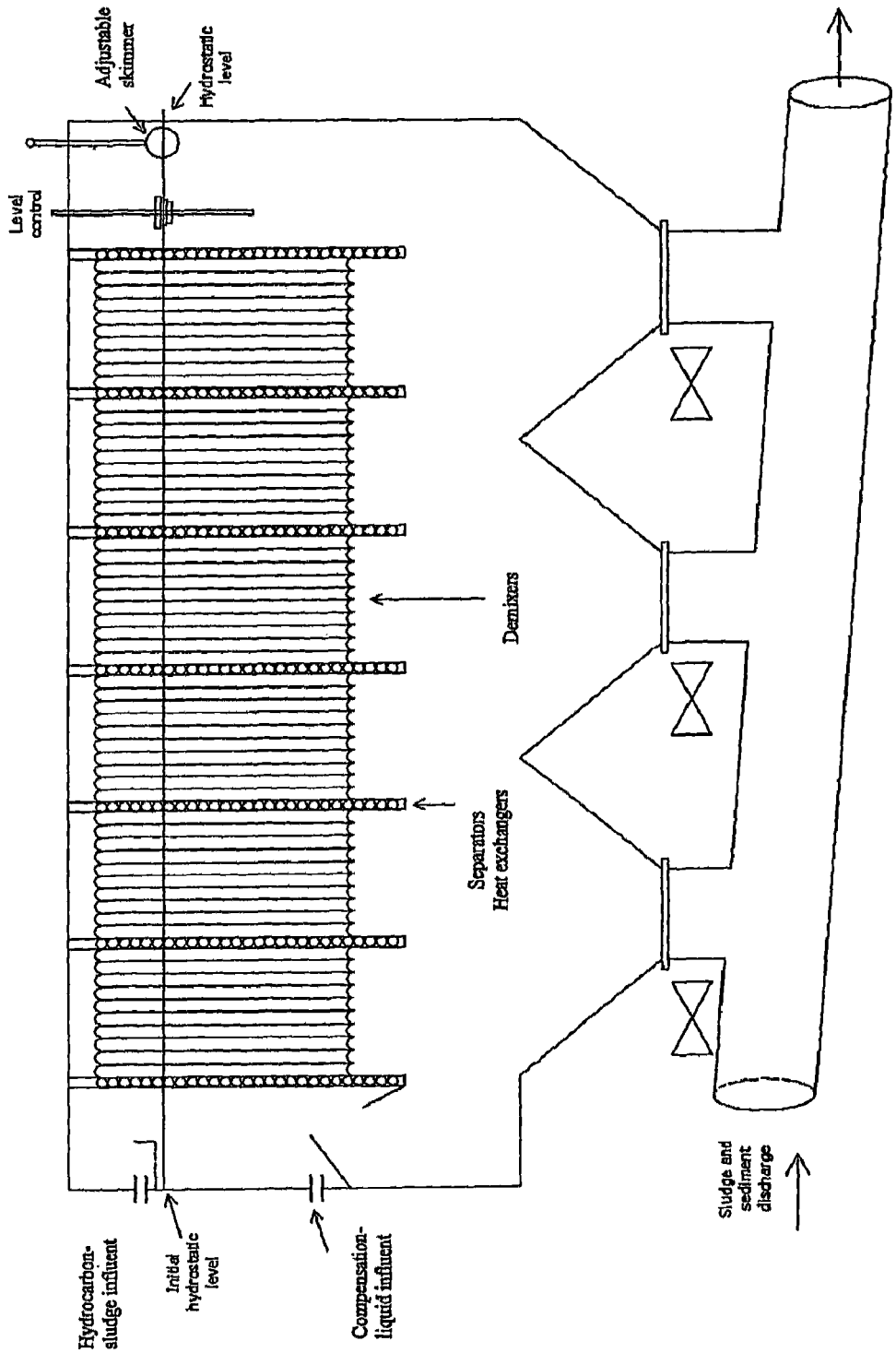
FIG. 5 is a schematic side elevation of a heat exchanger-separator-sedimentator used according to the invention.
Figure 6:
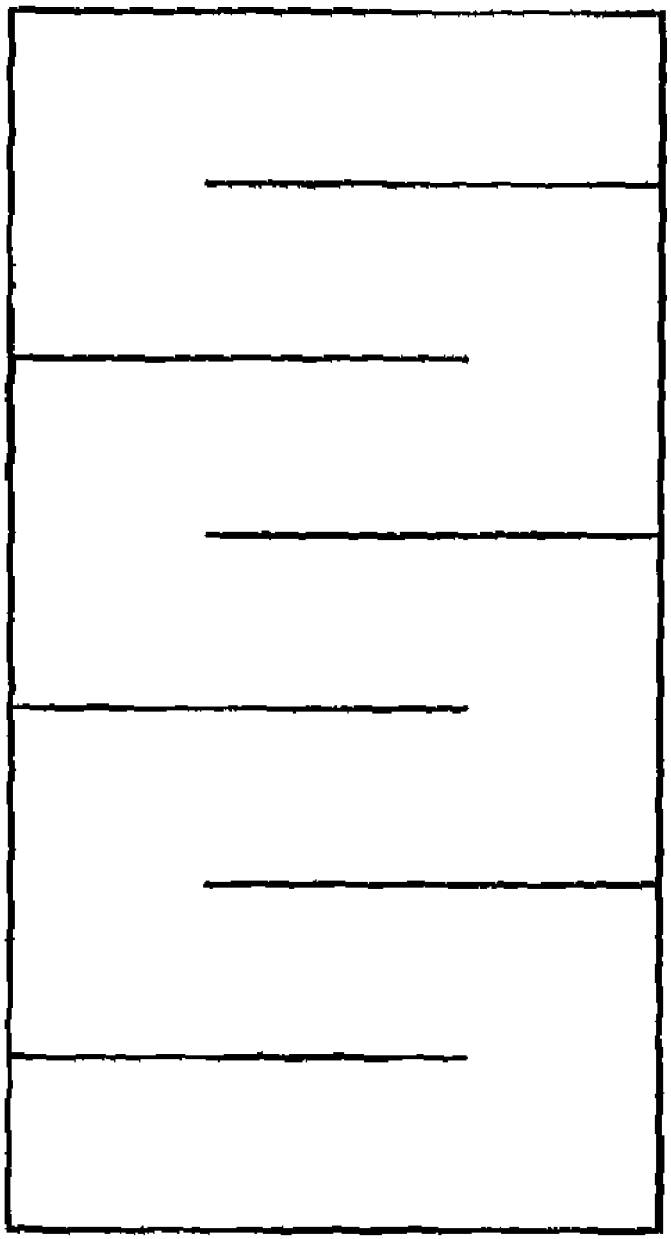
FIG. 6 is a top plan view of the heat exchanger-separator-sedimentator of FIG. 5.

1.) Any possible pre-treatments determined during the feasibility tests and specified in the process protocol are carried out. The pre-treatment of hydrocarbon residue, where applicable, is made using the HSS (heater-separator-sedimentator) system, which comprises a heat exchanger, a separator, and a sedimentator (see FIGS. 5 and 6). For heating, the HSS system uses the heat generated by the exothermal reaction in the reactor and transmitted by the heat exchanger, enabling recovery of the liquid phases of the hydrocarbon, separation of water, as well as sedimentation of the sludge and solid matter.

2.) Added to and mixed with the mass, with homogenous distribution, is the possible moistened catalyst of the quality and in the amount determined in the course of the feasibility study of Phase I regarding the preliminary activities.

3.) Homogenization and control of humidity is carried out by reducing the material to be treated to a homogeneous mass or mixture. In the case where the mass to be treated is made up of sludge or pasty or semi-fluid residue, the excessive moisture will be corrected with inert materials to be treated or locally available ones, such as ash or residue resulting from previous processes, and, in the case of fixation of metals, a cement-bentonite mix is to be added.

4.) Once the mass is homogenized and the right level of specific humidity has been reached, the reagent of the quality and in the amount set down in the process protocol is added and mixed with homogeneous distribution.

Phase 3—Step 10 Reaction

The reaction starts to take place, in the terminal stage of conditioning, on account of the contact of the reagent with the moist content of the mass. Consequently, the administration of the reagent must be made at a certain speed, with uniform distribution within the conditioned mass, after which it is necessary to isolate the mass immediately from the atmospheric air in order to create the conditions of absence of oxygen.

The conditions of absence of oxygen, i.e., of isolation of the already conditioned mass, ready for the reaction, from the atmosphere can be obtained in two different ways: using the reactor or else using the pile.

Figure 4:
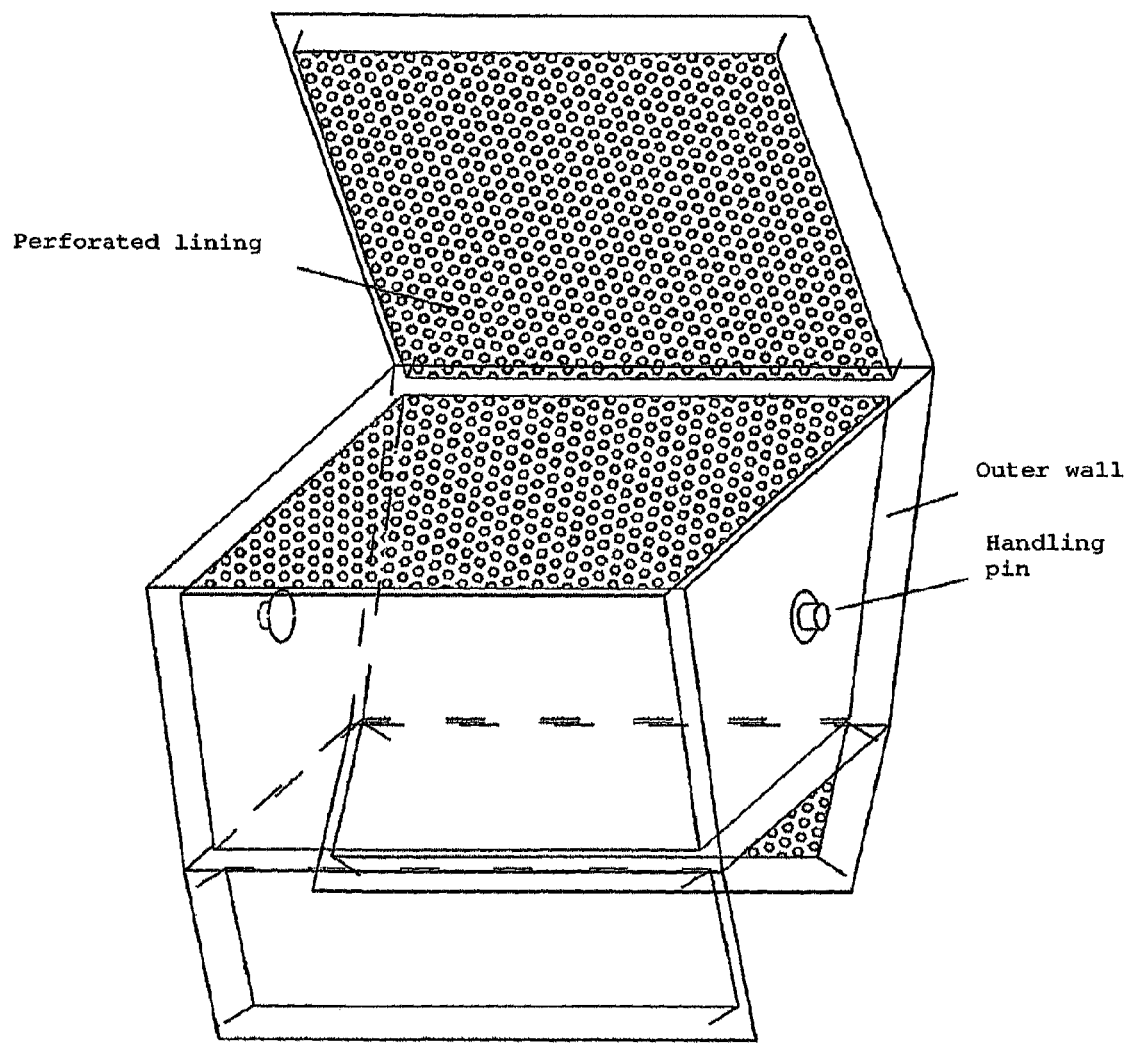
FIG. 4 is a perspective schematic view of a typical reactor that can be used in the process according to the invention.

A.) Reactor—the conditioned mass for the reaction is stowed in a reactor, i.e., a double-bodied hermetically sealed container (see FIG. 4), provided with thermocouples for monitoring the temperatures generated by the mass owing to the exothermal reaction.

Said reactor is basically made up of an outer casing, equipped with a closing lid, the internal surface of said casing being completely lined with a perforated lining in order to reduce adhesion of the mass to be treated to the inner surface of the reactor (this is particularly useful if the mass comprises hydrocarbon residue or the like).

Said outer casing is also provided with means for facilitating handling thereof using handling means of a known type.

The reactor technique is indicated for fixed plants or mobile plants for enabling large volumes to be treated.

The reactors provided for treatment of hydrocarbon residue and residue that may potentially generate temperatures higher than 200° C. for appreciable reaction times may be equipped with heat exchangers. Said heat exchangers will enable recovery of the heat produced by the high level of energy liberated by the exothermal reaction. The heat recovered may be used, among other things, in the pre-treatment of hydrocarbon residue that is to undergo treatment and in other utilities.

B.) Pile—The conditioned mass is set in a pile for the reaction. It is covered with a layer having a thickness of a few centimeters (minimum 2 to 3 cm) of inert material for the first batch, and subsequently the mass will be covered with the residue resulting from batches previously treated. In order to monitor the course of the reaction, penetration thermometers having a scale adequate for the nature of the treatment will be positioned on the periphery and in the central part of the pile.

The pile technique is indicated for small quantities or sporadic activities.

The reaction will be monitored by thermometers or thermocouples by detection of the parabolic curve described by the temperature produced by the exothermal reaction in the body of the mass.

The reaction can last from 15 minutes up to 72 hours, as indicated in Table 1.

Said duration, which is determined in the feasibility test and is set down in the process protocol, depends upon the specific reactivity of the reagent, the specific humidity of the catalyst, the nature of the contaminant, the nature of the contaminated matrix to be treated, and the purpose of the treatment (oxidation, fixation, desiccation, sterilization).

In any case, monitoring is necessary to control and adapt the process to the real situations, which are variable and dynamic.

According to the process described, the exothermal reaction is interrupted when the production of heat is exhausted, i.e., when the temperature curve has dropped to 50-60° C., in the case of desiccation and sterilization treatments, or to 80-100° C., in the case of oxidation and fixation treatments.

From an operative point of view, the interruption of the reaction occurs with emptying-out of the reactor into the purposely designed selective riddle or with breaking-up of the pile.

Phase 3—Step 11 Recovery of resources with CTO

The CTO (cold thermal oxidation) process according to the invention enables recovery of resources and energy. In effect, the liquid phase of the hydrocarbons or other reusable liquids are recovered with the adoption of the HSS system, whilst the heat recovered by the reactors is distributed in the utilities.

The residue coming from the process, immediately after interruption of the reaction, is passed through a riddle to be cooled, demixed, and separated into a dry, sandy, inert, calcined residue for reuse and coarse materials to be differentiated and sent on for recovery and recycling.

The dry, sandy, calcined, compressible, inert material can be reused either immediately after the process in concrete-mixing plants, in cement factories, or as compost for agricultural purposes (if it comes from the treatment of biological sludge), or, after the period of maturation of at least 16 days and after release and leachate tests in compliance with the regulatory standards, in civil and public works, as filler material and as thermally insulating and sound-proofing, water-repellent, herbicidal material for foundations and subgrades, or, in maintenance operations, as oil-absorbent, antiskid, and herbicidal substrate.

The coarse materials of the dry treated residue, once selected and differentiated, can be sent on for reuse. For example, the materials recovered from USW may be sent on for recycling, the materials of animal or vegetable origin can be used as compost for agricultural purposes, whilst the coarse inert matter can be sent to cement factories or disposed of in inert landfills.

As regards the HSS (heater-separator-sedimentator) system, certain observations may be made.

The HSS is an apparatus that incorporates three techniques, which are currently applied separately, in a single system, thus advantageously obtaining a considerable saving in terms of energy, machinery, and space. This unit comprises: a heat generator (heat exchanger); an oil/water separator; and a sedimentator (IMHOFF tank) for enabling precipitation and settlement of sludge.

The above system enables heating of the residue to be treated in order to fluidify it and favour the other treatment phases. It can use the heat produced by the energy released by the exothermal reaction if it is adopted in the pre-treatment steps in CTO (cold thermal oxidation) plants. If it is used on its own, it can be supplied by external heat generators.

In addition to this, the HSS enables recovery of the liquid phase from the hydrocarbon residue to be treated, which, since it has a specific weight lower than unity, flows through the separators over the liquid that ensures the hydrostatic level.

The HSS enables decantation of the residue by separating the water from the oil in an effective and fast way by means of the demixers installed between one separator and another.

Finally, the HSS favours sedimentation of the sludge and solid matter that accumulate in the Imhoff sectors so that they can be controlled and discharged automatically, with restoration of the hydrostatic level.

The present invention has been described and illustrated in one of its preferential embodiments, but it is clear that any person skilled in the sector may make technically and/or functionally equivalent modifications and/or replacements, without thereby departing from the sphere of protection of the present industrial patent right.

The invention claimed is:

1. A process for exothermal treatment and recovery of waste material, comprising:
   (1) mixing the waste material with:
      (i) a catalyst comprising a porous inert material containing water in pores therein; and
      (ii) a reagent comprising: calcium oxide (CaO), calcium hydroxide (Ca(OH)$_2$) or mixtures thereof;
   (2) subjecting the mixed waste material from step (1) to an exothermal reaction in the absence of oxygen, the exothermal reaction being controlled within a pre-determined temperature range and conducted for a period of time that causes sterilization and desiccation of the waste material but does not cause ignition of the waste material; and
   (3) producing and recovering a dry mass residue.

2. The process according to claim 1, wherein step (1) comprises performing, in order, step (i) followed by step (ii).

3. The process according to claim 1, further comprising:
   before step (1), selecting an appropriate catalyst and an appropriate reagent that will provide the pre-determined temperature range to the exothermal reaction; and
   during step (2), controlling the exothermal reaction to maintain a temperature within the pre-determined temperature range.

4. The process according to claim 1, wherein the absence of oxygen is provided by utilizing a charcoal-pile technique, and the charcoal-pile reduces emissions to the atmosphere.

5. The process according to claim 1, wherein the waste material comprises urban solid waste, sludge generated by water treatment, residues from industrial, agricultural or food processing operations, soil or inert material contaminated by organic-chemical compounds, material comprising hydrocarbon or organic-chemical compounds, or animal excrement.

6. The process according to claim 1, wherein the exothermal reaction occurs at a temperature of 60-120° C.

7. The process according to claim 1, wherein the exothermal reaction occurs at a temperature of 150-250° C.

8. The process according to claim 1, wherein the exothermal reaction occurs at a temperature of greater than 250° C.

9. The process according to claim 1, wherein:
   the waste material comprises biological sludge from non-industrial water treatment; and
   the exothermal reaction occurs at a temperature of 60-100° C. for 15-60 minutes.

10. The process according to claim 1, wherein:
    the waste material comprises damp urban solid waste (USW), non-differentiated solid waste, non-differentiated waste of vegetable origin;
    the exothermal reaction occurs at a temperature of 80-120° C. for 15-60 minutes so that fixation, sterilization and desiccation of the waste material occurs.

11. The process according to claim 1, wherein:
    the waste material comprises biological sludge from industrial water treatment; and
    the exothermal reaction occurs at a temperature of 150-250° C. for 1.5 to 24 hours so that fixation, sterilization and desiccation of the waste material occurs.

12. The process according to claim 1, wherein:
    the waste material comprises residue from industrial processes, soil and inert material contaminated by organic matrices, or mixtures thereof; and
    the exothermal reaction occurs at a temperature of 150-250° C. for 8 to 48 hours so that fixation, sterilization and desiccation of the waste material occurs.

13. The process according to claim 1, wherein:
    the waste material comprises residue from hydrocarbon and organic-chemical compounds; and
    the exothermal reaction occurs at a temperature of equal to or greater than 250° C. for 12 to 72 hours so that oxidation, fixation, sterilization and desiccation of the waste material occurs.

14. The process according to claim 1, wherein the absence of oxygen is provided by utilizing a batch reactor, and the batch reactor controls emissions to the atmosphere.

15. The process according to claim 1, wherein the CaO and $Ca(OH)_2$ are in granulate form having a grain size of approximately 3-15 mm.

16. The process according to claim 15, wherein the CaO and $Ca(OH)_2$ comprises a mixture of granulate having a grain size of approximately 3-5 mm.

17. The process according to claim 15, wherein the CaO and $Ca(OH)_2$ is a mixture of granulate comprising 50% granules having a grain size of approximately 3-5 mm and 50% granules having a grain size of approximately 5-7 mm.

18. The process according to claim 15, wherein the CaO and $Ca(OH)_2$ is a mixture of granulate comprising 50% granules having a grain size of approximately 5-7 mm and 50% granules having a grain size of approximately 7-10 mm.

19. The process according to claim 15, wherein the CaO and $Ca(OH)_2$ is a mixture of granulate comprising 30% granules having a grain size of approximately 3-5 mm, 30% granules having a grain size of approximately 5-7 mm, and 40% granules having a grain size of approximately 10-15 mm.

20. The process according to claim 15, wherein the CaO and $Ca(OH)_2$ is a mixture of granulate comprising 20% granules having a grain size of approximately 3-5 mm, 20% granules having a grain size of approximately 5-7 mm, and 60% granules having a grain size of approximately 10-15 mm.

21. The process according to claim 1, wherein the porous inert material moistened with water comprises water in a range of 20-50%.

22. The process according to claim 1, wherein the porous inert material comprises pores that dilate by the increased temperature of the exothermic reaction.

23. The process according to claim 1, wherein contaminants are released from the waste material during the exothermal reaction, and residual contaminants are fixated in pores of the porous inert material.

24. The process according to claim 1, wherein the waste material comprises hydrocarbon compounds, the process further comprising:
pre-treating the waste material with a heater-separator-sedimentator (HSS) system; and
recovering a liquid phase of the hydrocarbon compounds.

25. The process according to claim 24, wherein the HSS system comprises a heat-exchanger, and the heat produced by the exothermal reaction is transmitted by the heat-exchanger to the pre-treatment step.

26. The process according to claim 24, wherein the batch reactor comprises:
a double-bodied hermetically sealed container, and
thermocouples for monitoring temperatures generated during the exothermal reaction.

27. The process according to claim 26, wherein the batch reactor further comprises a heat exchanger configured to recover the heat produced by the exothermal reaction.

28. The process according to claim 4, wherein the charcoal-pile technique comprises:
arranging the mixed waste material being subjected to the exothermal reaction in a pile; and
covering the material with a layer of inert material that is at least 2-3 cm thick.

29. The process according to claim 28, wherein the charcoal-pile technique comprises:
further covering said material covered with the layer of inert material with a residue generated from a previously treated batch of waste material.

30. The process according to claim 26, wherein the batch reactor comprises:
an external casing equipped with a closing lid, an internal surface of said casing being completely lined with a perforated lining in order to reduce a degree of adhesion of the waste material to be treated to the internal surface of the reactor.

31. The process according to claim 30, wherein the closing lid is positioned on top of the reactor, and the reactor comprises a bottom wall that can be opened in order to remove the treated waste material.

32. The process according to claim 1, wherein the process is stopped when the temperature of the exothermal reaction has dropped to 50-60° C.

33. The process according to claim 1, wherein the process is stopped when the temperature of the exothermal reaction has dropped to 80-100° C.

* * * * *